United States Patent [19]

Lax et al.

[11] Patent Number: 4,537,076

[45] Date of Patent: Aug. 27, 1985

[54] APPARATUS FOR AND METHOD OF RANDOM VIBRATION CONTROL

[75] Inventors: David R. Lax, Irvine, Calif.; Michael Page, Reading; James S. Johnstone, Surrey, both of England

[73] Assignee: Schlumberger Electronics (U.K.) Limited, Farnborough, England

[21] Appl. No.: 571,163

[22] Filed: Jan. 16, 1984

[30] Foreign Application Priority Data

Jan. 26, 1983 [GB] United Kingdom ............. 8302169

[51] Int. Cl.$^3$ .............................................. G01N 29/00
[52] U.S. Cl. ........................................ 73/662; 73/664
[58] Field of Search ............... 367/189, 190; 181/119, 181/121; 73/662, 663, 664, 665, 667

[56] References Cited

U.S. PATENT DOCUMENTS

| | | | |
|---|---|---|---|
| 3,420,098 | 1/1969 | Painter et al. | 73/664 |
| 3,710,082 | 1/1973 | Sloane | 73/664 |
| 3,842,661 | 10/1974 | Marshall et al. | 73/664 |
| 3,848,115 | 11/1974 | Sloane et al. | 73/664 |
| 3,895,343 | 7/1975 | Farr | 367/190 |

OTHER PUBLICATIONS

M. A. Underwood, "Applications of Optimal Control Concepts to Digital Shaker Control Systems", Dec., 1981, p. 1, lines 17-35.

F. J. Harris, "On the Use of Windows for Harmonic Analysis with the Discrete Fourier Transform", Jan. 1978, p. 6, lines 9-12.

Hewlett Packard, "Vibration Control Theory", pp. 1-12.

F. J. Carvalhal, "Identification and Adaptive Control in Earthquake and Vibration Testing of Large Structures".

Primary Examiner—Howard A. Birmiel
Attorney, Agent, or Firm—Dale Gaudier

[57] ABSTRACT

In order to ensure that the vibrations of a system under test are in accordance with a reference spectral density $Z(w)$, the system is driven by a signal $x_n(t)$ provided by an inverse discrete Fourier transform (IDFT) with random phases introduced by a function $R_n(w)$ and the response spectral density $Y_n(w)$ provided by a DFT is brought into agreement with $Z(w)$ by a feedback loop. Moreover, in order to ensure that this is done in one iteration, $X'_n(w)$ is derived from $x_n(t)$ by a DFT and divided by $Y_n(w)$ and the quotient is multiplied with $Z(w)$ to provide the new input $x_n(w)$ for the IDFT. The division cancels out the random factor which is present in both $X'_n(w)$ and $Y_n(w)$. The system thus equalizes both rapidly and stably.

11 Claims, 2 Drawing Figures

4,537,076

APPARATUS FOR AND METHOD OF RANDOM VIBRATION CONTROL

FIELD OF THE INVENTION

The present invention relates to apparatus for random vibration control, of the type comprising a driver for imparting vibrations to a system under test, and a transducer sensing the actual vibrations of the system under test. A feedback loop arranged between the transducer and driver equalize the apparatus to a state in which the power spectrum of the actual vibrations approximates a reference power spectrum. The feedback loop includes discrete Fourier transform (DFT) means, inverse discrete Fourier transform (IDFT) means, and equalizing means responsive to the output of the DFT means and the reference power spectrum to establish the input to the IDFT means. The apparatus may comprise means for randomising phases of the components of the drive signal for the driver provided by the IDFT means. The invention also relates to a method of random vibration control.

BACKGROUND OF THE INVENTION AND PRIOR ART

Apparatus of the type referred to above is well known. See for example "Applications of Optimal Control Concepts to Digital Shaker Control Systems" M. A. Underwood, Journal of the Society of Environmental Engineers, December 1981 pages 19 to 22. The apparatus is used in the testing of a variety of systems, for example equipment which will be subject to vibration in a vehicle or a model of an engineering structure for an area liable to earthquake, to mention just two of many possibilities. The reference power spectrum is determined in accordance with the properties of the real life drive system, e.g. by recording the frequency spectrum of a vehicle driven over rough terrain in the case of the first example above. The feedback loop is employed because the driver used in the apparatus cannot act as an infinite energy source and the actual vibrations differ from the drive signal in dependence upon the transfer function of the system under test. It is the power spectrum of the actual vibrations which has to correspond to the reference spectrum because, in real life the drive system does act substantially as an infinite energy source.

The phase randomization is known to be desirable for various reasons, including ensuring a Gaussian amplitude distribution and rendering the digital technique comparable with a purely analog technique. It is known to effect the randomization by associating with the set of amplitude values at the input to the IDFT means a set of random numbers which determine the phases of the corresponding frequency components in the time domain drive signal at the output of the IDFT means. The amplitude values and random numbers provide $R, \ominus$ inputs to the IDFT.

The basic form of the known apparatus is illustrated in FIG. 1 of the drawings. The drive signal $x_n(t)$ is applied via an amplifier 11 to the driver 10 which drives the system under test 12 (SUT) and which may be one of various commercially available devices such as shaker table or a powerful loudspeaker. The driver and SUT together have a transfer function $H(w)$ in the frequency domain. A transducer 14, again a commercially available device, provides the actual vibration signal $y_n(t)$ which is applied via an amplifier 15 to the DFT means 16 whose outputs is $Y_n(w)$. This data and the reference spectrum $Z(w)$ from a memory device 18 are applied to means 20 effecting the equalization algorithm, which is explained below. The resulting new drive spectrum $X_{n+1}(w)$ and the random number set $R_n(w)$ form a generator 22 are applied to the IDFT means 24 which provide $x(t)$.

The function of the equalization algorithm means 20 can be explained as follows.

The system is equalized when $$Y(w) = X(w) * H(w) \; O \; Z(w) \text{ or } X(w) = Z(w)/H(w) \tag{1}$$

Since $x(t)$ is a random process a single response spectrum $Y_n(w)$ gives random values of power spectral density. A true power spectral density estimate can only be derived by averaging many instantaneous results.

$$\overline{Y}(w) = \frac{1}{N} \sum_{n=1}^{N} Y_n(w) \tag{2}$$

The digital implementation of this control loop is effected by generating sample blocks of data $x_n(t)$ from estimated drive power spectra $X_n(w)$. The resulting system response $y_n(t)$ is sampled and fourier transformed to produce a response spectrum $Y_n(w)$.

From equation (1) it can be seen that $Y(w)$ can be equalized using the iteration $$X_{n+1}(w) = \frac{X_n(w)}{\overline{Y}(w)} * Z(w) \tag{3}$$

However this relies on $\overline{Y}(w)$ being a sufficiently accurate estimate of the response power spectral density.

Two methods of averaging are commonly used to reduce variance in $\overline{Y}(w)$. Exponential averaging allows frequent small changes to be made in drive spectrum. However loop stability is poor for the averaging time constants required to reduce variance sufficiently. This results in large over and under shoots in the estimated drive level and hence the overall equalization time is high.

Fixed memory averaging relies on driving an accurate stimate of $\overline{Y}(w)$ before any equalization is done. This means that the drive is changed by large amounts infrequently. For a linear SUT a more stable loop is produced but equalization is slow because of the large averaging time required. Moreover loop instability is more likely to be caused by non-linear elements in the SUT.

SUMMARY OF THE INVENTION

One of the objects of the present invention is to provide apparatus for random vibration control, and also a method of random vibration control, in which accurate equalization can be effected in a single loop iteration, without the stability problem of exponential averaging.

Another object is to provide such an apparatus and method wherein equalization takes place so rapidly that small changes in drive can occur continuously to accommodate SUT non-linearity.

The basis of the invention is a novel equalizing procedure. The drive signal $X_n(t)$ is subjected to a DFT to derive a frequency domain drive signal $X_n'(w)$. This signal is affected by any random factor which has been introduced in the IDFT which generates $x_n(t)$. This frequency domain drive signal is compared with the response spectral density $Y_n(w)$, as by division, whereby the random factor present in both $X_n'(w)$ and $Y_n(w)$ cancels out. The results of the comparison are used to provide the new input $X_n(w)$ to the IDFT from the reference power spectrum, as by multiplying this spectrum $Z(w)$ by the quotient $X_n'(w)/Y_n(w)$. Because of the cancellation of the random factor the system equalizes both rapidly and stably.

The invention resides in the novel method of equalization. The invention further resides in novel apparatus constructed to implement the improved equalization.

The invention will now be described in more detail, by way of example, with reference to the accompanying drawings, in which:

FIG. 1 is a block diagram of a known apparatus, already described above, and

FIG. 2 is a block diagram of apparatus embodying the invention.

(1) Sampling $y_n(t)$ to produce an input set of points
(2) Multiplication by a window function such as a Hanning window function.
(3) Discrete Fourier Transofrm.
(4) Mean square calculation of power spectral density.

These are entirely standard techniques in measuring power spectral density not merely in random vibration control but in a wide range of DFT applications.

With reference to block 24, the IDFT is used in conjunction with overlap processing to produce the drive signal. Overlap processing is a form of smoothing which suppresses the strong signal components which would otherwise result from the discontinuous nature of the frequency domain signal, and is again well known.

The invention is not concerned with any of the details of these known techniques which will not be further described.

Figure 1:
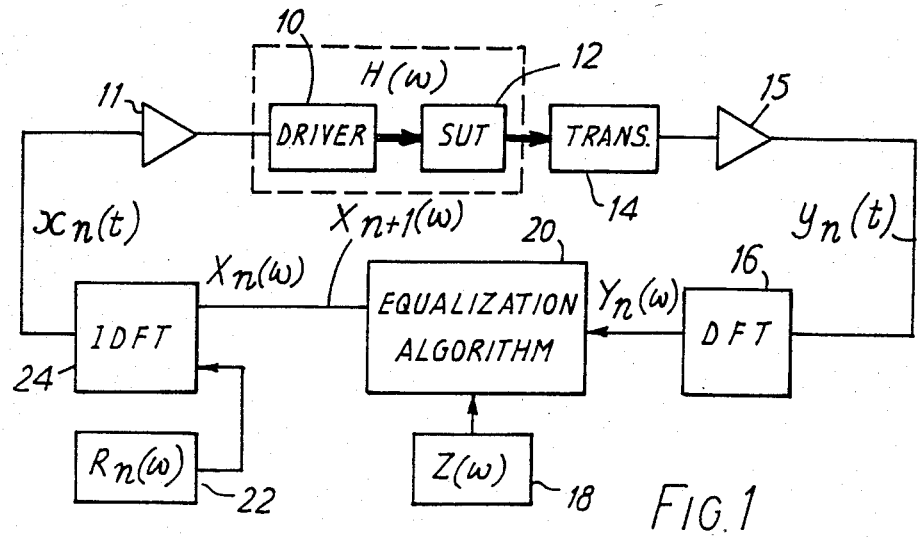
Figure 2:
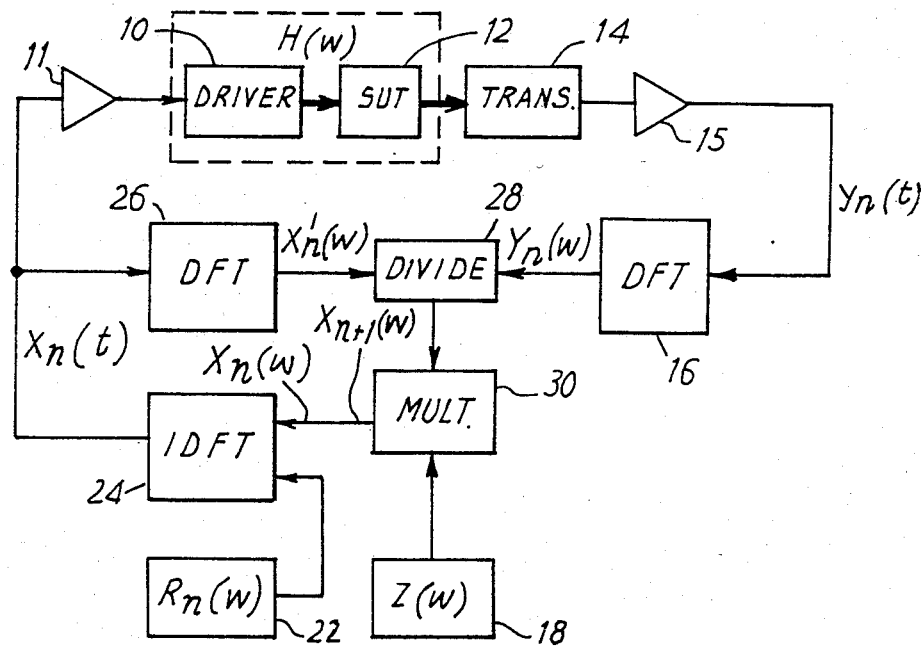
In FIG. 2 like parts and signals have the same references as in FIG. 1. Before turning to the description of FIG. 2 it should be noted that although block 16 is simply labelled DFT in FIGS. 1 and 2, the functions actually performed are as follows.

Turning now to FIG. 2, the signal $x_n(t)$ is additionally applied to a second DFT means 26 whose output is $X_n'(w)$ where:

$$X_n'(w) = X_n(w) * R_n(w) \qquad (4)$$

The response sample record $Y_n(w)$ is measured synchronously over the identical period of $X_n'(w)$ so that we have:

$$Y_n(w) = X_n(w) * R_n(w) * H(w) \qquad (5)$$

The iteration equation (3) now becomes:

$$X_{n+1}(w) = \frac{X_n(w) * R_n(w)}{Y_n(w)} * Z(x) \qquad (6)$$

$$= \frac{X_n'(w)}{Y_n(w)} * Z(w) \qquad (7)$$

The correctness of equation (6) can be seen by substituting for $Y_n(w)$ from equation (5) which yields:

$$X_{n+1}(w) = \frac{Z(w)}{H(w)} \qquad (8)$$

which is in accordance with equation (1).

Equation (7) is implemented by applying $X_n'(w)$ and $Y_n(w)$ to a divider 28 and applying the output of the divider and $Z(w)$ to a multiplier 30 which produces $X_{n+1}(w)$. It will be appreciated that the division and multiplication are point by point.

The invention enables equalization to be effected in a single iteration. The reason why this is possible, in spite of the random element introduced by $R_n(w)$, is that $R_n(w)$ cancels out, (cf. equations (6) and (7)). Provided that $Y_n(w)$ and $X_n'(w)$ are derived synchronously over the same interval as described above, both contain the same randomisation—hence the cancelling out.

$X_n'(w)$ is derived by the DFT 26 from $x_n(t)$, rather than directly from $X_n(w)$ and $R_n(w)$ because it is necessary to take account of the effective modification of $R_n(w)$ which is introduced by the window function of the DFT 16. The DFT 26 is thus made the same as the DFT 16, including the window function.

For full information regarding Hanning and other window functions see Proc IEEE Vol 66 No. 1 January 1978 pp 51–83 "On the use of Windows for Harmonic Analysis with the Discrete Fourier Transform", Fredric J. Harris.

Although FIG. 2 shows the signal from the multiplier 30 applied direct to the IDFT 24 it may be desirable to introduce an averaging function such as the well known exponential averaging, in order to avoid generating an over-large drive signal during initial adaptation, when $x_n(t)$ is still markedly discrepant. It is emphasized that exponential averaging within the framework of the present invention does not introduce loop stability problems as is the case when operating in accordance with the prior art, using equations (2) and (3). As a further safeguard against overdrive, the signal at the output of the IDFT 24 may be clipped to a predetermined maximum amplitude.

We claim:

1. In apparatus for random vibration control, of the type comprising means for controlling a driver for imparting vibrations to a system under test, means for receiving a signal from a transducer sensing the actual vibrations of the system under test, and a feedback loop arranged between the said means to equalize the apparatus to a state in which the power spectrum of the actual vibrations approximates a reference power spectrum, wherein the feedback loop includes means for performing the discrete Fourier transfer (DFT), means for performing the inverse discrete Fourier transform (IDFT), equalizing means responsive to the output of the DFT means and the reference power spectrum to establish the input to the IDFT means, and means for randomizing the phases of the components of the drive signal for the driver provided by the IDFT means, the improvement wherein the equalizing means comprise first means operative to compare the output of the DFT means with the corresponding drive signal in the frequency domain and second means responsive to the reference power spectrum and to the first means to derive the input to the IDFT means in accordance with the reference power spectrum modified by the results of the comparison to equalize the power spectrum of the actual vibrations to the reference power spectrum.

2. The invention according to claim 1, comprising a second DFT means responsive to the drive signal as applied to the driver to provide the drive signal in the frequency domain.

3. The invention according to claim 2, wherein the first-mentioned and the second DFT means include means for performing the same time domain window function.

4. The invention according to claim 2, comprising means which divide the output of the second DFT means by the output of the first-mentioned DFT means and means which multiply the quotient thus produced with the reference power spectrum.

5. A method of automatic random vibration control, comprising the steps of:
   (a) exciting a system under test by a drive signal $X_n(t)$,
   (b) deriving synchronously a signal $y_n(t)$ representing the actual vibration of the system under test,
   (c) subjecting the actual vibration signal to a discrete Fourier transform (DFT) to provide a frequency domain response signal $Y_n(w)$,
   (d) deriving a frequency domain drive signal $X_n'(t)$ corresponding to the drive signal $x_n(t)$,
   (e) comparing the frequency domain response signal with the frequency domain drive signal,
   (f) modifying a predetermined spectral density function $Z(w)$ in accordance with said comparison to derive a new frequency domain drive signal $X_{n+1}(w)$, and
   (g) deriving a fresh drive signal by application of an inverse discrete Fourier transform (IDFT) to said new frequency domain drive signal.

6. A method according to claim 5, wherein the first-said frequency domain drive signal $X_n'(t)$ is derived from the drive signal $x_n(t)$ by a second DFT.

7. A method according to claim 6, wherein the first and second DFTs utilize the same time domain window function during steps (c) and (d), respectively.

8. A method according to claim 6, further including the step of randomizing the phases of the components of the drive signal derived by application of the IDFT.

9. A method according to claim 6, wherein the first-said frequency domain drive signal $X_n'(t)$ is divided by the frequency domain response signal $Y_n(w)$ and the resulting quotient is multiplied with the predetermined spectral density function $Z(w)$ to derive the new frequency domain drive signal $X_{n+1}(w)$.

10. A method according to claim 5, wherein the new frequency drive signal is averaged with the existing frequency domain drive signal in accordance with a predetermined averaging function, before application of the IDFT to derive the fresh drive signal.

11. A method according to claim 5, wherein the drive signal is clipped to a predetermined maximum amplitude.

* * * * *